US008294434B2

(12) United States Patent  
Nishida

(10) Patent No.: US 8,294,434 B2  
(45) Date of Patent: Oct. 23, 2012

(54) CONSTANT CURRENT OUTPUT CONTROL TYPE SWITCHING REGULATOR

(75) Inventor: Junji Nishida, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 377 days.

(21) Appl. No.: 12/666,533

(22) PCT Filed: Aug. 7, 2008

(86) PCT No.: PCT/JP2008/064569
§ 371 (c)(1),
(2), (4) Date: Dec. 23, 2009

(87) PCT Pub. No.: WO2009/034810
PCT Pub. Date: Mar. 19, 2009

(65) Prior Publication Data
US 2010/0327832 A1   Dec. 30, 2010

(30) Foreign Application Priority Data

Sep. 12, 2007 (JP) ................................. 2007-236578

(51) Int. Cl.
*G05F 1/613* (2006.01)
(52) U.S. Cl. ........................................ 323/224; 323/282
(58) Field of Classification Search .................. 323/224, 323/283, 284, 282
See application file for complete search history.

(56) References Cited

U.S. PATENT DOCUMENTS

| 5,319,370 | A | 6/1994 | Signore et al. |
| 5,959,443 | A | 9/1999 | Littlefield |
| 6,781,353 | B2 * | 8/2004 | Rozsypal ....................... 323/224 |
| 6,989,657 | B2 | 1/2006 | Kirn |
| 7,893,677 | B2 * | 2/2011 | Nguyen ......................... 323/284 |
| 2006/0028192 | A1 | 2/2006 | Ryu et al. |
| 2006/0202669 | A1 | 9/2006 | Nishimori |
| 2008/0018387 | A1 | 1/2008 | Ryu et al. |

FOREIGN PATENT DOCUMENTS

| JP | 6-237171 | 8/1994 |
| JP | 11-220875 | 8/1999 |
| JP | 2003-219637 | 7/2003 |
| JP | 2006-50724 | 2/2006 |
| JP | 2006-517379 | 7/2006 |
| JP | 2006-254588 | 9/2006 |
| JP | 2007-4995 | 1/2007 |
| JP | 2007-82347 | 3/2007 |
| JP | 2007-108794 | 4/2007 |
| JP | 2007-110833 | 4/2007 |
| JP | 2007-202273 | 8/2007 |
| JP | 2007-202281 | 8/2007 |

(Continued)

*Primary Examiner* — Shawn Riley
(74) *Attorney, Agent, or Firm* — Cooper & Dunham LLP

(57) ABSTRACT

A constant current output control type switching regulator that reduces the number of parts, resolves the loss of the current running in the resistor, and eliminates the need to change the time constant of the integrator due to changing the inductor value. The switching regulator creates the adjustment reference voltage by multiplying the proportion of Vout/Vin by the reference voltage, and when the clock signal is high, the current sense voltage is sampled when the current of the initial current value runs in the switching transistor, and when the clock signal is low, the potential difference between the adjustment reference voltage and the sampled current sense voltage is added to the adjustment reference voltage and creates the second reference voltage; and with the signal CPOUT controls the operation of the transistors upon execution of PWM control.

10 Claims, 11 Drawing Sheets

FOREIGN PATENT DOCUMENTS

| | | |
|---|---|---|
| JP | 2007-209103 | 8/2007 |
| JP | 2007-209135 | 8/2007 |
| JP | 2007-209180 | 8/2007 |
| JP | 2007-252137 | 9/2007 |
| JP | 2008-72786 | 3/2008 |
| JP | 2008-72833 | 3/2008 |
| JP | 2008-72835 | 3/2008 |
| JP | 2008-131746 | 6/2008 |
| JP | 2008-131747 | 6/2008 |
| JP | 2008-178263 | 7/2008 |
| JP | 2008-206366 | 9/2008 |
| JP | 2008-228514 | 9/2008 |
| JP | 2009-5442 | 1/2009 |
| JP | 2009-65772 | 3/2009 |
| JP | 2009-71951 | 4/2009 |

* cited by examiner

CONSTANT CURRENT OUTPUT CONTROL TYPE SWITCHING REGULATOR

TECHNICAL FIELD

The present invention generally relates to a constant current output control type switching regulator, and more specifically, to a switching regulator that executes constant current output control.

BACKGROUND ART

FIG. 1 is a circuit diagram of a conventional switching regulator (For example, see Japanese Laid-Open Patent Application 2007-4995).

In the example of FIG. 1, constant current control is executed by using operational amplifiers for voltage control and current control, and detection of output current is done by using the voltage difference Vd yielded by the current running in the current sensing resistor.

FIG. 2 is a circuit diagram of a conventional switching regulator that executes constant current output control (For example, see Japanese Published Patent Application 2006-517379).

In the example of FIG. 1, due to using a resistor to detect output current there is a problem of loss arising from the current running in the corresponding resistor. To alleviate such loss there is an approach of reducing the resistance value of the resistor though then there arises the need to use a high precision operational amplifier. In the example of FIG. 2 an integral value is used for current detection thus in a case where the inductor value and the fixed frequency (PWM frequency) are different there arises the need to change the integral constant.

DISCLOSURE OF THE INVENTION

Accordingly, embodiments of the present invention may provide a novel and useful constant current output control type switching regulator solving one or more of the problems discussed above.

More specifically, the embodiments of the present invention may provide a constant current output control type switching regulator that resolves the above issues, eliminate the need for a resistor for current detection and an integrator for current detection, reduce the number of parts, resolve the loss of the current running in the resistor, and eliminate the need to change the time constant of the integrator due to the change to the inductor value without relying upon the inductor value, and convert the inputted voltage to the desired output current and output it.

One aspect of the present invention may be to provide a constant current output control type switching regulator that creates a predetermined constant current from an input voltage inputted to an input terminal and outputs it as an output current from an output terminal, which comprises a switching element that executes switching according to an inputted control signal, an inductor that is charged with an input voltage by the switching of the corresponding switching element, a rectifier element that discharges the inductor when the switching element is off and is in a cut-off state, a current detection circuit section that creates a proportional current proportional to the current running in the switching element and according to the corresponding proportional current creates a current sense voltage and outputs it, and to use the current sense voltage from the corresponding current detection circuit section and a second reference voltage of a control circuit section that executes PWM control for execution of a constant current output control by the switching element. The control circuit section creates an adjustment reference voltage by adjusting the predetermined first reference voltage according to the proportion of the output voltage which is the voltage of the output terminal and the input voltage, and creates the second reference voltage by adding the voltage difference of the corresponding adjustment reference voltage and the current sense voltage to the corresponding adjustment reference voltage, then executes voltage comparison between the current sense voltage and the corresponding second reference voltage, and by using a pulse signal which represents the corresponding comparison results executes PWM control to execute the constant current output control.

In the above-mentioned constant current output control type switching regulator according to an embodiment of the present invention, the control circuit section may be arranged to create the adjustment reference voltage by multiplying the first reference voltage with the proportion obtained by dividing the output voltage with the input voltage.

In the above-mentioned constant current output control type switching regulator according to an embodiment of the present invention, more specifically, the control circuit section may be comprised of a reference voltage adjustment circuit that multiplies the first reference voltage by the proportion obtained by dividing the output voltage with the input voltage creating the adjustment reference voltage and outputs it, a reference conversion circuit that adds the voltage difference of the adjustment reference voltage and the current sense voltage to the corresponding adjustment reference voltage creating the second reference voltage and outputs it, a voltage comparison circuit that executes a voltage comparison of the second reference voltage from the corresponding reference conversion circuit and the current sense voltage creating the pulse signal representing the corresponding comparison results and outputs it, and a control circuit where the pulse signal outputted from the voltage comparison circuit is PWM controlled with the predetermined clock signal and that executes switching control of the switching element with the PWM pulse signal obtained from the corresponding PWM control.

In the above-mentioned constant current output control type switching regulator according to an embodiment of the present invention, the reference conversion circuit may also be structured with a switched capacitor circuit.

Another aspect of the present invention may be to provide an constant current output control type switching regulator that creates a predetermined constant current from the inputted input voltage in a input terminal and outputs it as an output current from an output terminal, which comprises a switching element that executes switching according to a inputted control signal, an inductor that is charged with an input voltage by switching of the switching element, a rectifier element that discharges the inductor when the switching element is off and is in a cut-off state, a current detection circuit section that creates a proportional current proportional to the current running in the switching element and according to the corresponding proportional current creates a current sense voltage and outputs it, and a control circuit section that creates an adjustment reference voltage by adjusting the predetermined first reference voltage according to the proportion of the output voltage of the input voltage and voltage of the output terminal, executes a voltage comparison between the current sense voltage and the corresponding adjustment reference voltage, and according to the corresponding comparison results turns off the switching element, executes the detection of whether the inductor current running in the inductor has become zero or not, and according to the corresponding detection results turns on the switching element and executes VFM control for the execution of constant current output control to the switching element.

In the above-mentioned constant current output control type switching regulator according to an embodiment of the present invention, the control circuit section may be arranged to turn off the switching element if the current sense voltage exceeds the adjustment reference value, and to turn on the switching element if the inductor current is detected to be zero from the voltage of the connection section of the switching element and the inductor.

In the above-mentioned constant current output control type switching regulator according to an embodiment of the present invention, the control circuit section may be arranged to create the adjustment reference voltage by multiplying the first reference voltage by double the proportion obtained by dividing the output voltage with the input voltage.

Another aspect of the present invention may be to provide a constant current output control type switching regulator that creates a predetermined constant current from an inputted input voltage in an input terminal and outputs it as an output current from an output terminal, which comprises a switching element that executes switching according to an inputted control signal, an inductor that is charged with an input voltage by switching of the switching element, a rectifier element that discharges the inductor when the switching element is off and is in a cut-off state, a current detection circuit section that creates a proportional current proportional to the current running in the switching element and according to the proportional current creates a current sense voltage and outputs it, and a control circuit section that creates an adjustment reference voltage by adjusting the predetermined first reference voltage according to the proportion of the output voltage of the input voltage and voltage of the output terminal, and according to the voltage of the corresponding adjustment voltage executes PWM control for the execution of constant current output control or executes VFM control for the execution of constant current output control of the switching element. When the adjustment reference voltage is below the predetermined third reference voltage, the control circuit section creates a second reference voltage by adding the voltage difference of the adjustment reference voltage and the current sense voltage to the corresponding adjustment reference voltage, executes a voltage comparison between the current sense voltage and the corresponding second reference voltage, and with the pulse signal representing the corresponding comparison results executes PWM control for the execution of constant current output control. When the adjustment reference voltage is above the predetermined third reference voltage, the control circuit section executes a voltage comparison between the current sense voltage and the adjustment reference voltage, and according to the corresponding comparison results the switching element is turned off, executes the detection of whether the inductor current running in the inductor has become zero or not, and according to the corresponding detection results the switching element is turned on, executes VFM control for the execution of constant current output control of the switching element.

In the above-mentioned constant current output control type switching regulator according to an embodiment of the present invention, when executing VFM control for the execution of the constant current output control, the control circuit section may be arranged to turn off the switching element if the current sense voltage exceeds the adjustment reference value and to turn on the switching element if the inductor current from the voltage of the connection section of the switching element and inductor is detected to be zero.

In the above-mentioned constant current output control type switching regulator according to an embodiment of the present invention, the control circuit section may be arranged to create the adjustment reference voltage by multiplying the first reference voltage by the proportion obtained by dividing the output voltage with the input voltage.

The embodiments of the present invention may provide a constant current output control type switching regulator that may eliminate the need for a resistor for current detection and an integrator for current detection, reduce the number of parts and at the same time resolve the loss of the current running in the resistor, and without relying upon the inductor value may make the change to the time constant of the integrator due to changing the inductor value unnecessary.

Other objects, features, and advantages of the present invention will become more apparent from the following detailed description when read in conjunction with the accompanying drawings.

BEST MODE FOR CARRYING OUT THE INVENTION

A description is given below, with reference to the FIG. 3 through FIG. 11 of embodiments of the present invention.

Figure 1:
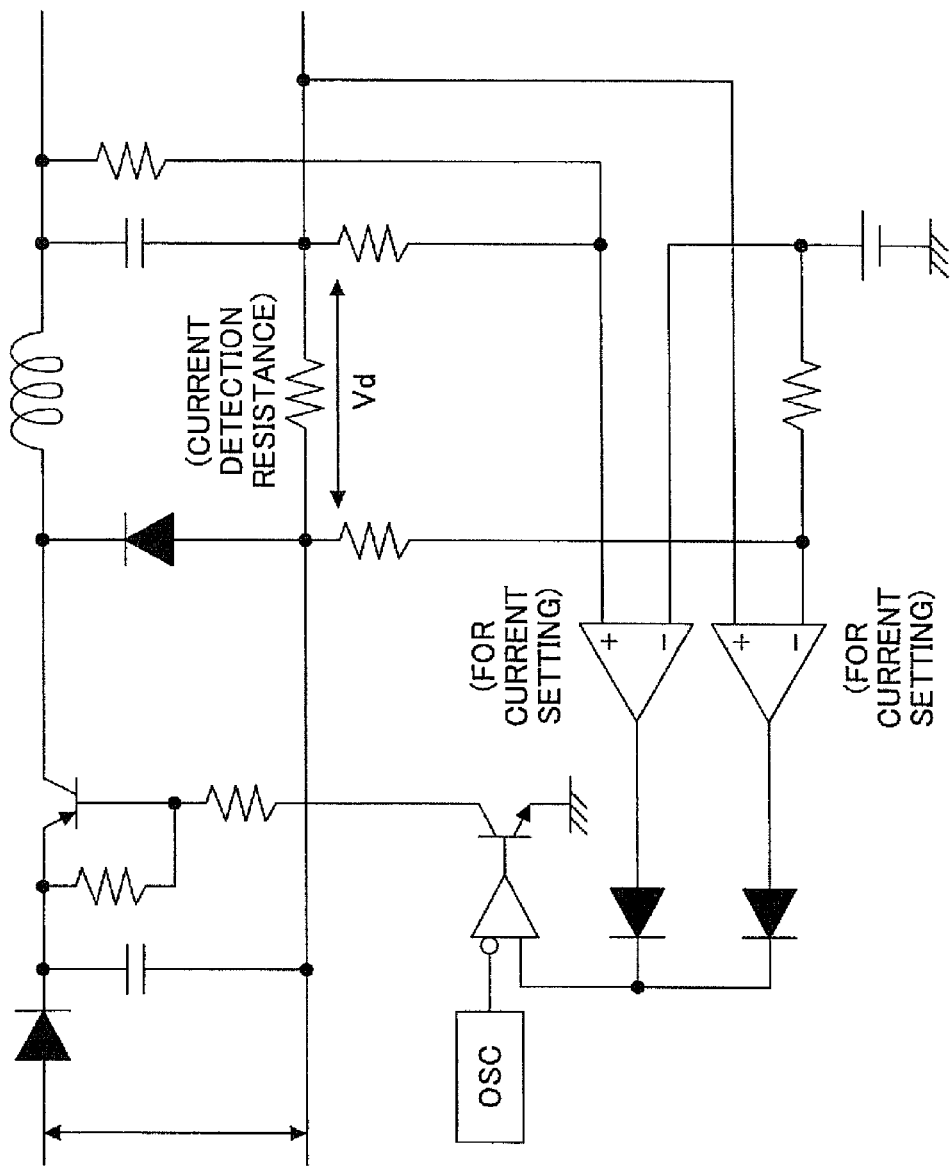
FIG. 1 is a circuit diagram illustrating a conventional switching regulator.
Figure 2:
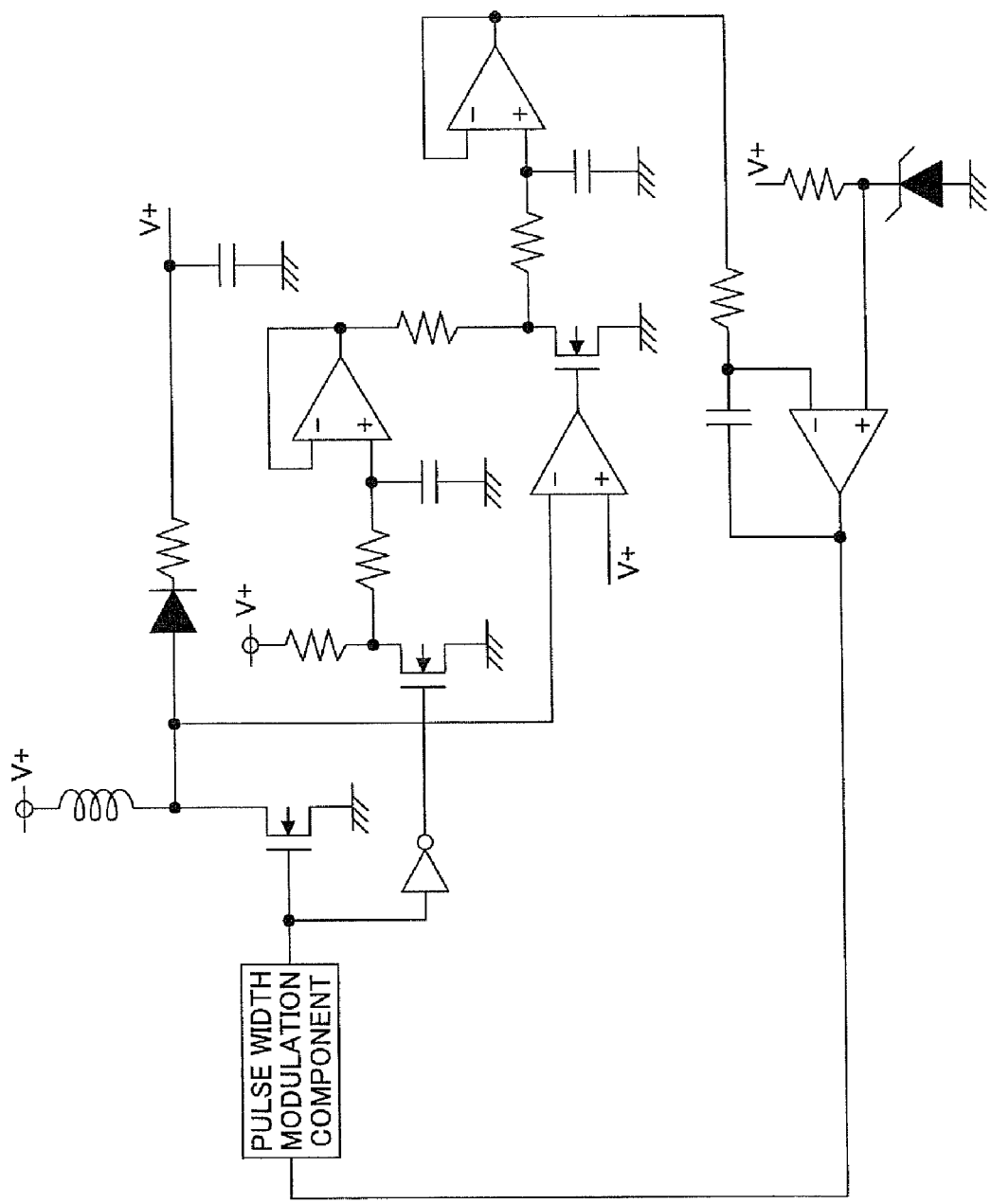
FIG. 2 is a circuit diagram illustrating another conventional switching regulator.
Figure 3:
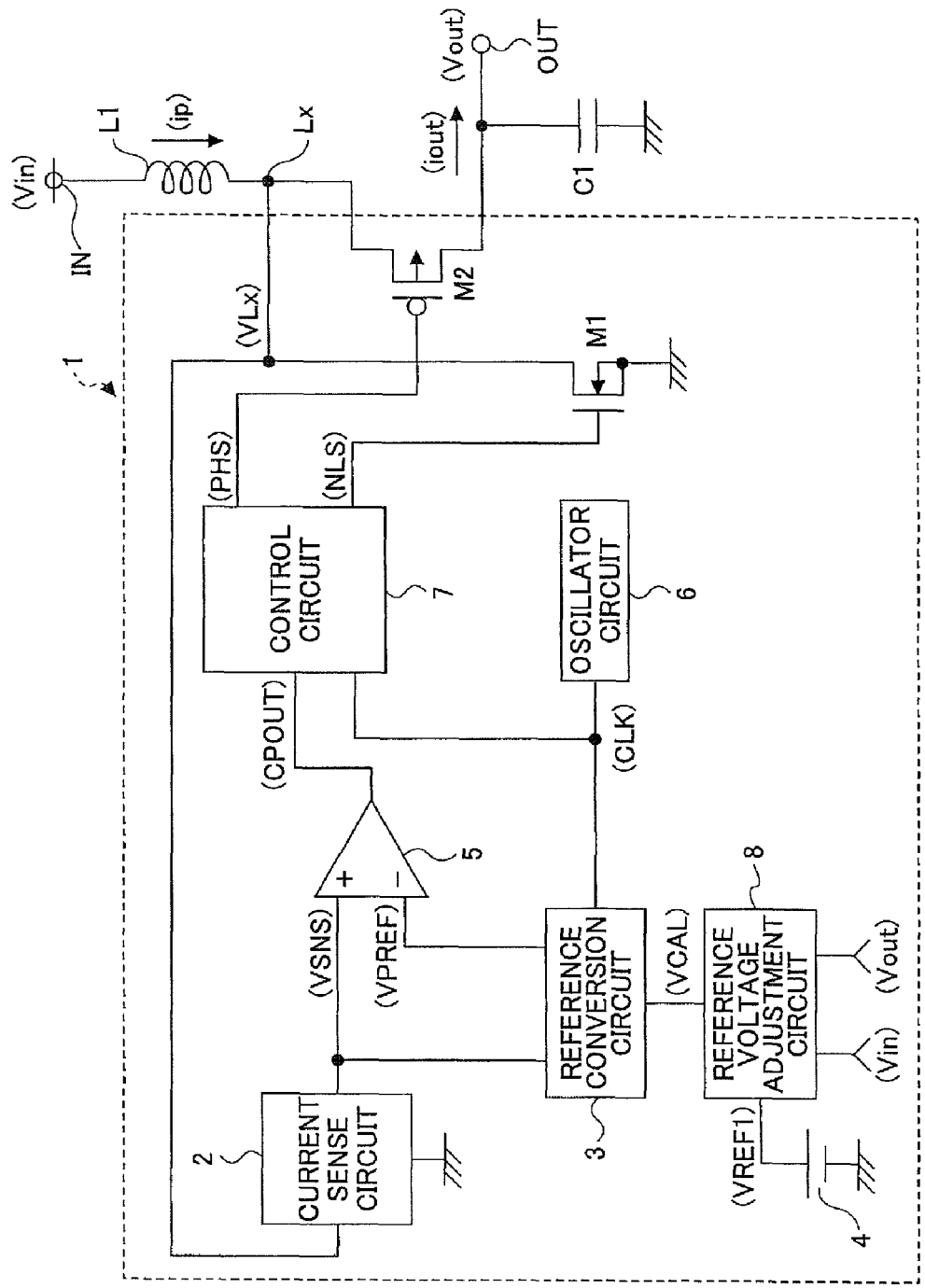
FIG. 3 is a circuit diagram illustrating the first example of a constant current output control type switching regulator.

Shown in FIG. 3 is a circuit diagram illustrating the first example of a constant current output control type switching regulator according to an embodiment of the present invention.

In FIG. 3, the constant current output control type switching regulator 1 (hereinafter referred to as switching regulator) creates a predetermined constant current iout from an input voltage Vin inputted via an input terminal IN and outputs it from an output terminal OUT and is a non-isolated type switching regulator that uses an inductor.

The switching regulator 1 is comprised of an inductor L1 that executes switching according to an inputted control signal, a switching transistor M1 formed of a NMOS transistor which executes charging to the inductor L1 with the input voltage Vin, and a synchronous rectifier transistor M2 formed of a PMOS transistor which executes discharging of the inductor L1 when the switching transistor M1 is off. The switching regulator 1 also comprises a current sense circuit 2 which executes detection of output current iout, a reference conversion circuit 3, a reference voltage generation circuit 4 which creates and outputs a predetermined first reference voltage VREF1, a comparator 5, an oscillator circuit 6 which creates a predetermined clock signal CLK and outputs it, a control circuit 7 which executes switching control of the switching transistor M1 and the synchronous rectifier transistor M2, a reference voltage adjustment circuit 8 which adjusts the first reference voltage VREF1 with a predetermined method and creates an adjustment reference voltage VCAL and outputs it, and a capacitor C1.

The switching transistor M1 forms the switching element, the synchronous rectifier transistor M2 forms the rectifying element, the current sense circuit 2 forms the current detection circuit section, and the reference conversion circuit 3, the reference voltage generation circuit 4, the comparator 5, the oscillator circuit 6, the control circuit 7, and the reference voltage adjustment circuit 8 form the control circuit section. Also in the switching regulator shown in FIG. 3, each circuit except the inductor L1 and the capacitor C1 may be integrated into one IC, and the switching transistor M1 and/or the synchronous rectifier transistor M2 may be, excluding the inductor L1 and the capacitor C1, integrated into one IC.

In between the input terminal IN and ground potential, the inductor L1 and the switching transistor M1 are connected in series, and the connection section of the inductor L1 and the switching transistor M1 is designated as Lx. Connected in between the connection section Lx and the output terminal OUT is the synchronous rectifier transistor M2 and connected in between the output terminal OUT and the ground potential is the capacitor C1. In the current sense circuit 2, the voltage VLx of the connection section Lx is inputted and the output signal VSNS of the current sense circuit 2 is inputted to the non-inversion input terminal of the comparator 5 and the reference conversion circuit 3. In the reference voltage adjustment circuit 8, the first reference voltage VREF1, the input voltage Vin, and an output voltage Vout are inputted and the created adjustment reference voltage VCAL is outputted to the reference conversion circuit 3.

Also, in the reference conversion circuit 3, the clock signal CLK is inputted and the created second reference voltage VPREF at the reference conversion circuit 3 is inputted to the inversion input terminal of the comparator 5. In the control circuit 7, an output signal CPOUT and the clock signal CLK of comparator 5 are inputted, and the control circuit 7, from the inputted corresponding signals creates the control signal NLS to control the operation of the switching transistor M1 and outputs it to the gate of the switching transistor M1 as well as creates the control signal PHS to control the operation of the synchronous rectifier transistor M2 and outputs it to the gate of the synchronous rectifier transistor M2.

In such a structure, the reference voltage adjustment circuit 8 multiplies the proportion of the output voltage Vout/input voltage Vin by the first reference voltage VREF1 and adjusts to create the adjustment reference voltage VCAL and outputs it. The reference conversion circuit 3, when the clock signal CLK is at a high-level, samples the current sense voltage VSNS when the current of a initial current value iO runs in the switching transistor M1, and when the clock signal CLK is at a low level, adds to the adjustment reference voltage VCAL the voltage difference ΔVS between the adjustment reference voltage VCAL and the sampled current sense voltage VSNS and creates a second reference voltage VPREF and outputs it to the inversion input terminal of the comparator 5. The comparator 5 executes a voltage comparison between the current sense voltage VSNS and the second reference voltage VPREF and when the current sense voltage VSNS exceeds the second reference voltage VPREF outputs a high-level signal CPOUT.

The control circuit 7, PWM controls the signal CPOUT with the clock signal CLK and from the corresponding PWM controlled pulse signal creates control signals PHS and NLS and outputs them. When the switching transistor M1 is on and is in a conduction state and the synchronous rectifier transistor M2 is off and is in a cut-off state the inductor L1 is charged with the input voltage Vin, and when the switching transistor M1 is off and is in a cut-off state and the synchronous rectifier transistor M2 is on and is in a conduction state the inductor L1 is discharged and the corresponding discharged energy adds to the input voltage Vin thereby amplifying the input voltage Vin.

Figure 4:
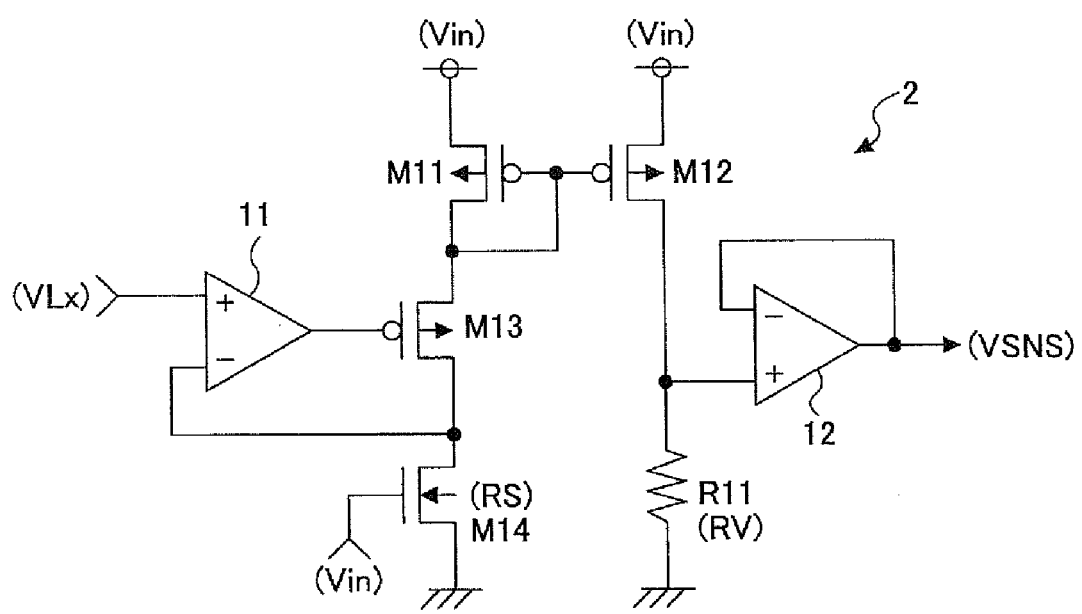
FIG. 4 is a circuit diagram illustrating the current sense circuit of FIG. 3.

Shown in FIG. 4 is a circuit diagram illustrating an example of a current sense circuit 2 of FIG. 3.

The current sense circuit 2 is comprised of operational amplifiers 11 and 12, PMOS transistors M11~M13, a NMOS transistor M14, and a resistor R11.

The PMOS transistors M11 and M12 form a current mirror circuit and in the PMOS transistors M11 and M12, each source is connected to the input voltage Vin, the gates are connected, and the connection section is connected to the drain of the PMOS transistor M11. In between the drain of the PMOS transistor M11 and the ground potential are the PMOS transistor M13 and the NMOS transistor M14 connected in series, and by reason of an input of the input voltage Vin to the gate of the NMOS transistor M14, the NMOS transistor M14 forms a constant current source.

The connection section of the PMOS transistor M13 and the NMOS transistor M14 is connected to the inversion input terminal of the operational amplifier 11, to the non-inversion input terminal of the operational amplifier 11 is inputted voltage VLx, and the output terminal of the operational amplifier 11 is connected to the gate of the PMOS transistor M13. Connected in between the drain of the PMOS transistor M12 and ground potential is the resistor R11, and the connection section of the PMOS transistor M12 and the resistor R11 is connected to the non-inversion input terminal of the operational amplifier 12. The output terminal of the operational amplifier 12 is connected to the inversion input terminal of the operational amplifier 12 whereby the operational amplifier 12 forms a voltage follower and outputs the current sense voltage VSNS from the output terminal.

The operational amplifier 11 executes operational control of the PMOS transistor M13 to make the voltage of the connection section of the PMOS transistor M13 and the NMOS transistor M14 have the voltage VLx. Due to such control, in the NMOS transistor M14 a proportional current to that of the current running in the switching transistor M1 runs and the corresponding proportional current is turned back by the current mirror circuit of the PMOS transistor M11 and M12, runs through the resistor R11, and is converted to voltage at the resistor R11; and at the operational amplifier 12 impedance conversion is executed and is outputted as the current sense voltage VSNS.

If the resistance value of the turned on switching transistor M1 is RN, the resistance value of the turned on NMOS transistor M14 is RS, the resistance value of resistor R11 is RV, and the inductor current running in the inductor L1 is ip, the current sense voltage VSNS can be represented by the following formula.

$$VSNS = ip \times RN/RS \times RV \quad (1)$$

Figure 5:
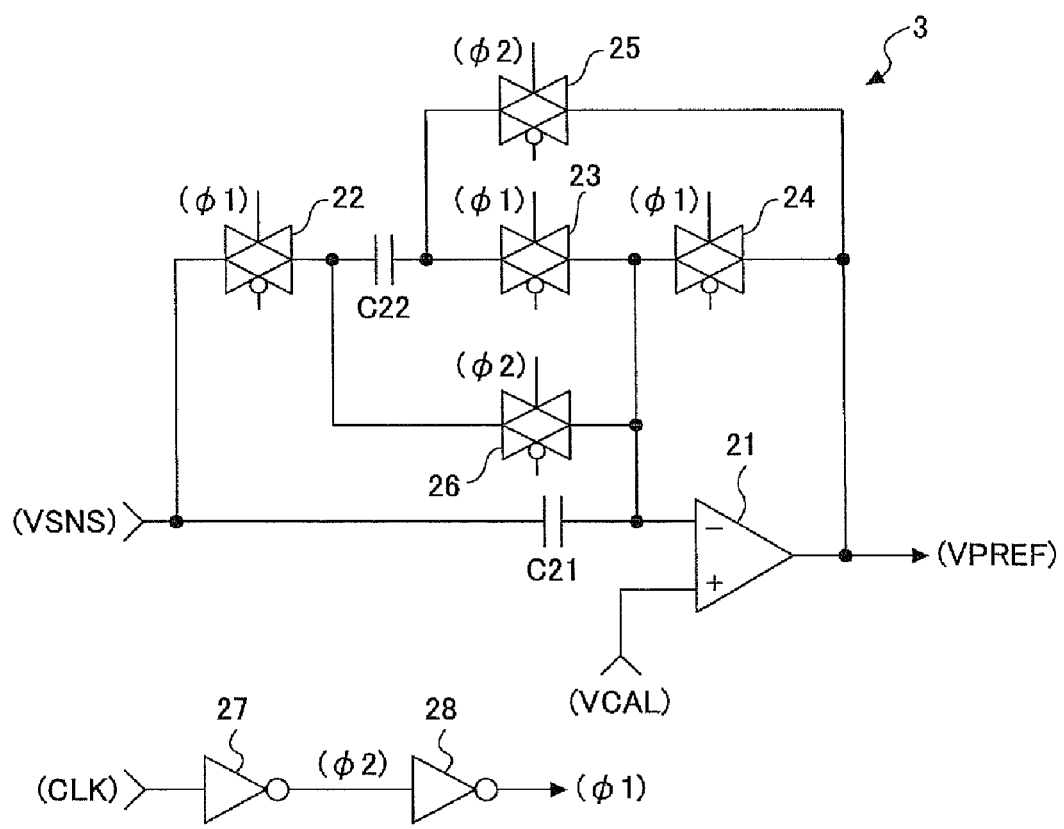
FIG. 5 is a circuit diagram illustrating the reference conversion circuit of FIG. 3.

Next, shown in FIG. 5 is a circuit diagram illustrating an example of the reference conversion circuit 3 of FIG. 3.

In FIG. 5, the reference conversion circuit 3 is comprised of an operational amplifier 21, analog switches 22~26, inverters 27 and 28, and capacitors C21 and C22 of the same capacity forming the switched capacitor circuit.

To the non-inversion input terminal of the operational amplifier 21 the adjustment reference voltage VCAL is inputted, and connected between the current sensor voltage VSNS and the inversion input terminal of the operational amplifier 21 is the capacitor C21. Connected in between a terminal of the capacitor C22 and the current sense voltage VSNS is the analog switch 22, and connected between the connection section of the capacitor C22 and the analog switch 22 and the inversion input terminal of the operational amplifier 21 is analog switch 26.

Connected in between the other terminal of the capacitor C22 and the output terminal of the operational amplifier 21 is the series circuit of the analog switches 23 and 24 and the analog switch 25 connected in parallel, and the connection section of the analog switches 23 and 24 is connected to the inversion input terminal of the operational amplifier 21. The second reference voltage VPREF is outputted from the output terminal of the operational amplifier 21. The inverter 27 creates the inversion clock signal φ2 by inverting the signal level of the clock signal CLK and outputs it and the inverter 28 further inverts the signal level of the inversion clock signal φ2 to create the clock signal φ1 and outputs it. The analog switches 22~24, execute switching according to the clock signal φ1, when the clock signal φ1 is at a high level it is turned on and is in a conduction state and when the clock signal φ1 is at a low level it is turned off and is in a cut-off state. Also, the analog switches 25 and 26 execute switching according to the inversion clock signal φ2, when the inversion clock signal φ2 is at a high level it is turned on and is in a conduction state and when the inversion clock signal φ2 is at a low level it is turned off and is in a cut-off state.

In the reference conversion circuit 3, when the clock signal φ1 is at a high level, the current sense voltage VSNS is sampled when a current of the initial current value iO runs in the switching transistor M1, and when the inversion clock signal φ2 is at a high level, the voltage difference ΔVS between the adjustment reference voltage VCAL and the sampled current sense voltage VSNS is added to the adjustment reference voltage VCAL to create the second reference voltage VPREF. Therefore the second reference voltage VPREF can be represented by the following formula (2).

$$VPREF = VCAL + \Delta VS \quad (2)$$

Figure 6:
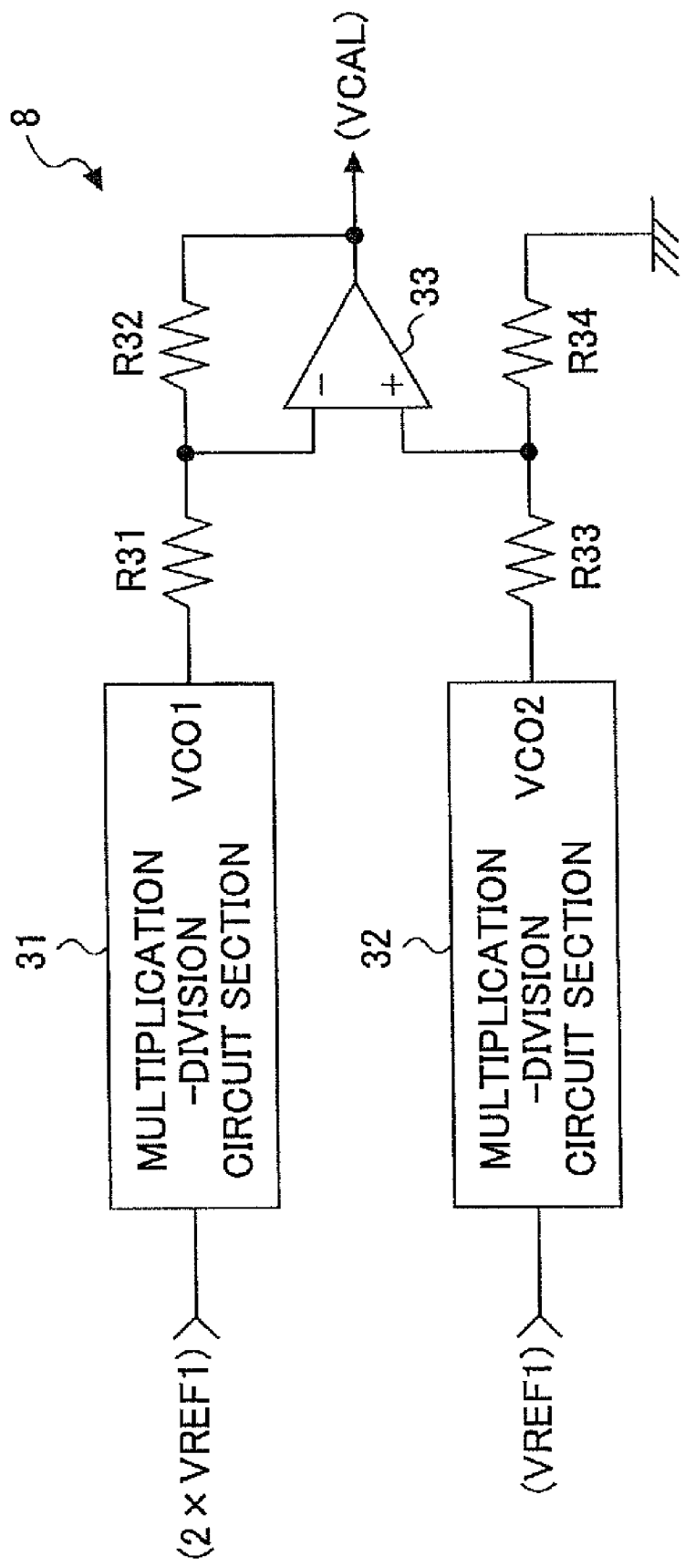
FIG. 6 is a circuit diagram illustrating the reference voltage adjustment circuit of FIG. 3.

Next, shown in FIG. 6 is a circuit diagram illustrating an example of the reference voltage adjustment circuit 8 of FIG. 3.

In FIG. 6, the reference voltage adjustment circuit 8 is comprised of multiplication-division circuit sections 31 and 32, an operational amplifier 33, and resistors R31~R34, with the resistors R31~R34 all having the same resistance value. Note that the reference voltage adjustment circuit 8 is equipped with a circuit to double the first reference voltage VREF 1 though the corresponding circuit is omitted from FIG. 6.

In the multiplication-division circuit section 31a voltage double the first reference voltage VREF is inputted, and in the multiplication-division circuit section 32 the first reference voltage VREF1 is inputted. Connected in between the output terminal of the multiplication-division circuit section 31 and the inversion input terminal of the operational amplifier 33 is the resistor R31, and connected in between the output terminal and the inversion input terminal of the operational amplifier 33 is the resistor R32. Also in between the output terminal of the multiplication-division circuit section 32 and ground potential is the resistors R33 and R34 connected in series, and the connection section of the resistors R33 and R34 is connected to the non-inversion input terminal of the operational amplifier 33. If the output voltage of the multiplication-division circuit section 31 is designated as VCO1 and the output voltage of the multiplication-division circuit section 32 is designated as VCO2, the output voltage of the operational amplifier 33 which is the adjustment reference voltage VCAL is represented as (VCO2-VCO1).

Figure 7:
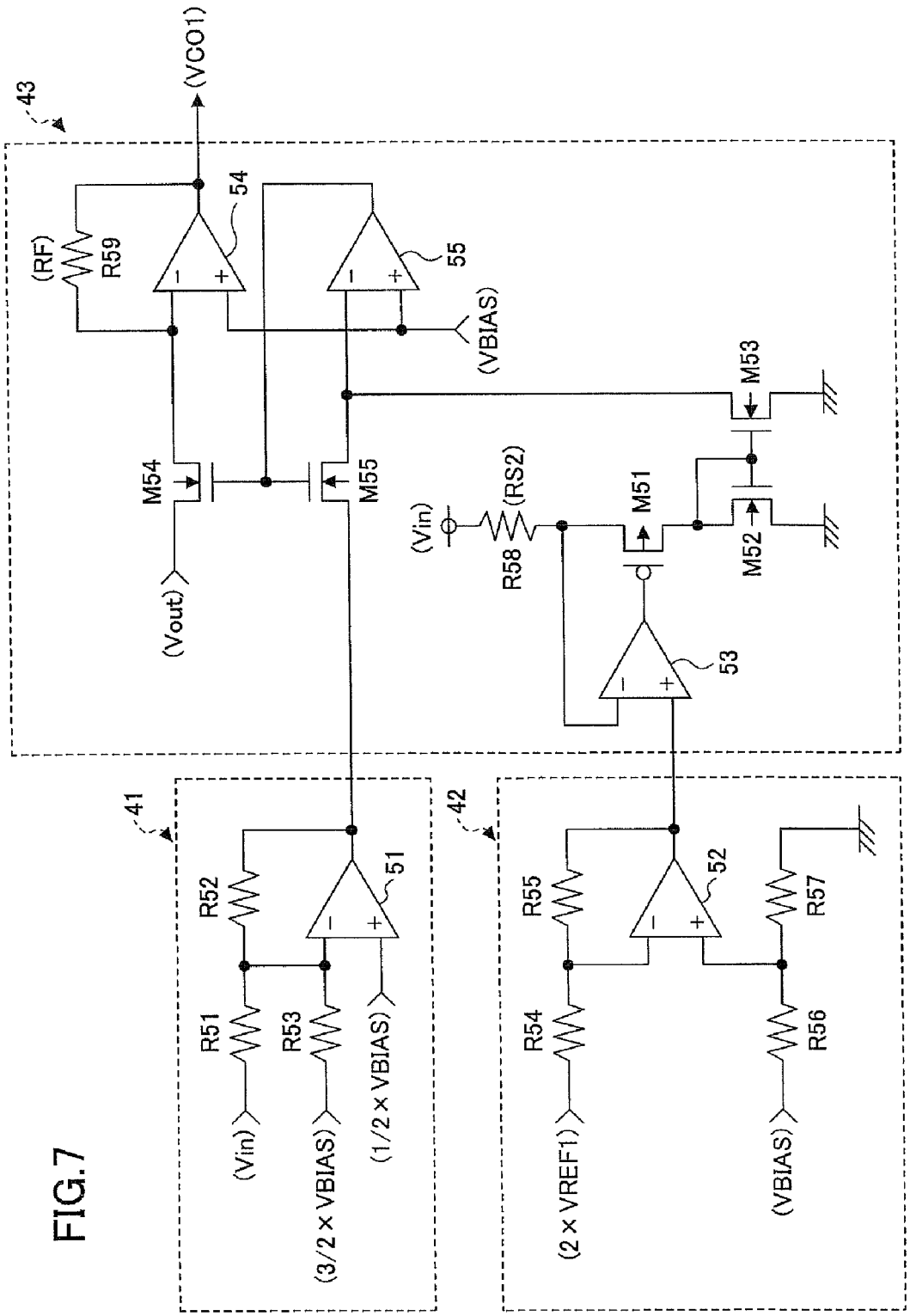
FIG. 7 is a circuit diagram illustrating the multiplication-division circuit section 31 of FIG. 6.

Shown in FIG. 7 is a circuit diagram illustrating the multiplication-division circuit sections 31 and 32 of FIG. 6, by reason of the multiplication-division circuit sections 31 and 32 having the same circuit structure with a difference of only a different input voltage, FIG. 7 is an explanation pertaining to the multiplication-division circuit section 31. Note that in the case of the multiplication-division circuit section 32 the 2×VREF1 in FIG. 7 becomes VREF1.

In FIG. 7, the multiplication-division circuit section 31 is comprised of an addition component 41, a subtraction component 42, and a multiplication-division component 43. In the addition component 41 the input voltage Vin, a voltage of the predetermined bias voltage VBIAS multiplied 3/2 times, and a voltage of the bias voltage VBIAS multiplied 1/2 times are inputted, and in the subtraction component 42 a voltage of double the first reference voltage VREF1 and the bias voltage VBIAS are inputted. In the multiplication-division component 43 the output voltage of the addition component 41 and the subtraction component 42, the output voltage Vout and the bias voltage VBAIS are inputted, and the output voltage VCO1 is outputted from the multiplication-division component 43. Note that the multiplication-division circuit section 31 is equipped with a circuit that creates the bias voltage VBAIS, a circuit that multiplies 3/2 times the bias voltage VBAIS, and a circuit that multiplies 1/2 times the bias voltage VBAIS, but the corresponding circuits are omitted from FIG. 7.

The addition component 41 is comprised of an operational amplifier 51 and resistors R51~R53 with the same resistance value. Inputted into the non-inversion input terminal of the operational amplifier 51 is a voltage of 1/2×VBIAS, and connected in between the voltage of 3/2×VBIAS and the inversion input terminal of the operational amplifier 51 is the resistor R53, and connected in between the input voltage Vin and the inversion input terminal of the operational amplifier 51 is the resistor R51. Also, connected in between the output terminal and the inversion input terminal of the operational amplifier 51 is the resistor R52. The output terminal of the operational amplifier 51 forms the output terminal of the addition component 41.

The subtraction component 42 is comprised of an operational amplifier 52 and resistors R54-R57 with the same resistance value. Connected in between the doubled voltage of the first reference voltage VREF1 which is the input voltage of the multiplication-division circuit section 31 and the inversion input terminal of the operational amplifier 52 is the resistor R54, and connected in between the output terminal and the inversion input terminal of the operational amplifier 52 is the resistor R55. Also, in between the bias voltage VBIAS and ground potential are the resistors R56 and R57 connected in series, and the connection section of the resistors R56 and R57 is connected to the non-inversion input terminal of the operational amplifier 52. The output terminal of the operational amplifier 52 forms the output terminal of the subtraction component 42.

The multiplication-division component 43 is comprised of operational amplifiers 53~55, a PMOS transistor M51, NMOS transistors M52~M55, and resistors R58 and R59. The NMOS transistors M52 and M53 form a current mirror circuit and at the NMOS transistors M52 and M53 each source is connected to ground potential, the gates are connected, and the corresponding connection section is connected to the drain of the NMOS transistor M52. Connected in between the input voltage Vin and the drain of the NMOS transistor M52 is the resistor R58 and the PMOS transistor M51 connected in series, and the connection section of the resistor R58 and the PMOS transistor M51 is connected to the inversion input terminal of the operational amplifier 53. Inputted into the non-inversion input terminal of the operational amplifier 53 is the output voltage of the subtraction component 42, and the output terminal of the operational amplifier 53 is connected to the gate of the PMOS transistor M51. The drain of the NMOS transistor M53 is connected to the inversion input terminal of the operational amplifier 55.

Connected in between the output voltage Vout and the inversion input terminal of the operational amplifier 54 is the NMOS transistor M54, and connected in between the output terminal and the inversion input terminal of the operational amplifier 54 is resistor R59. Also, connected in between the output terminal of the addition component 41 and the inversion input terminal of the operational amplifier 55 is the NMOS transistor M55, and the NMOS transistors M54 and M55 have their gates connected and the corresponding connection section is connected to the output terminal of the operational amplifier 55. Inputted into the non-inversion input terminals of the operational amplifiers 54 and 55 is the bias voltage VBIAS, and the output terminal of the operational amplifier 54 forms the output terminal of the multiplication-division circuit section 31.

If the resistance value of the resistor R58 is designated as RS2, and the resistance value of the resistor R59 is designated as RF, the output voltage VCO1 of the multiplication-division circuit section 31 can be represented by the following formula (3).

$$VCO1=-RF\times RS2\times Vout/Vin\times 2VREF+(2\times VREF/Vin\times RF\times RS2+1)\times VBIAS \quad (3)$$

Similarly the output voltage VCO2 of the multiplication-division circuit section 32 can be represented by the following formula (4).

$$VCO2=-RF\times RS2\times Vout/Vin\times VREF+(VREF/Vin\times RF\times RS2+1)\times VBIAS \quad (4)$$

Therefore the adjustment reference voltage VCAL which is outputted from the reference voltage adjustment circuit 8 can be represented by the following formula (5).

$$VCAL=VCO2-VCO1=RF\times RS2\times Vout/Vin\times VREF \quad (5)$$

As shown in formula (5), the adjustment reference voltage VCAL outputted from the reference voltage adjustment circuit 8 is a value attained by multiplying the proportion Vout/Vin by the first reference voltage VREF1.

Figure 8:
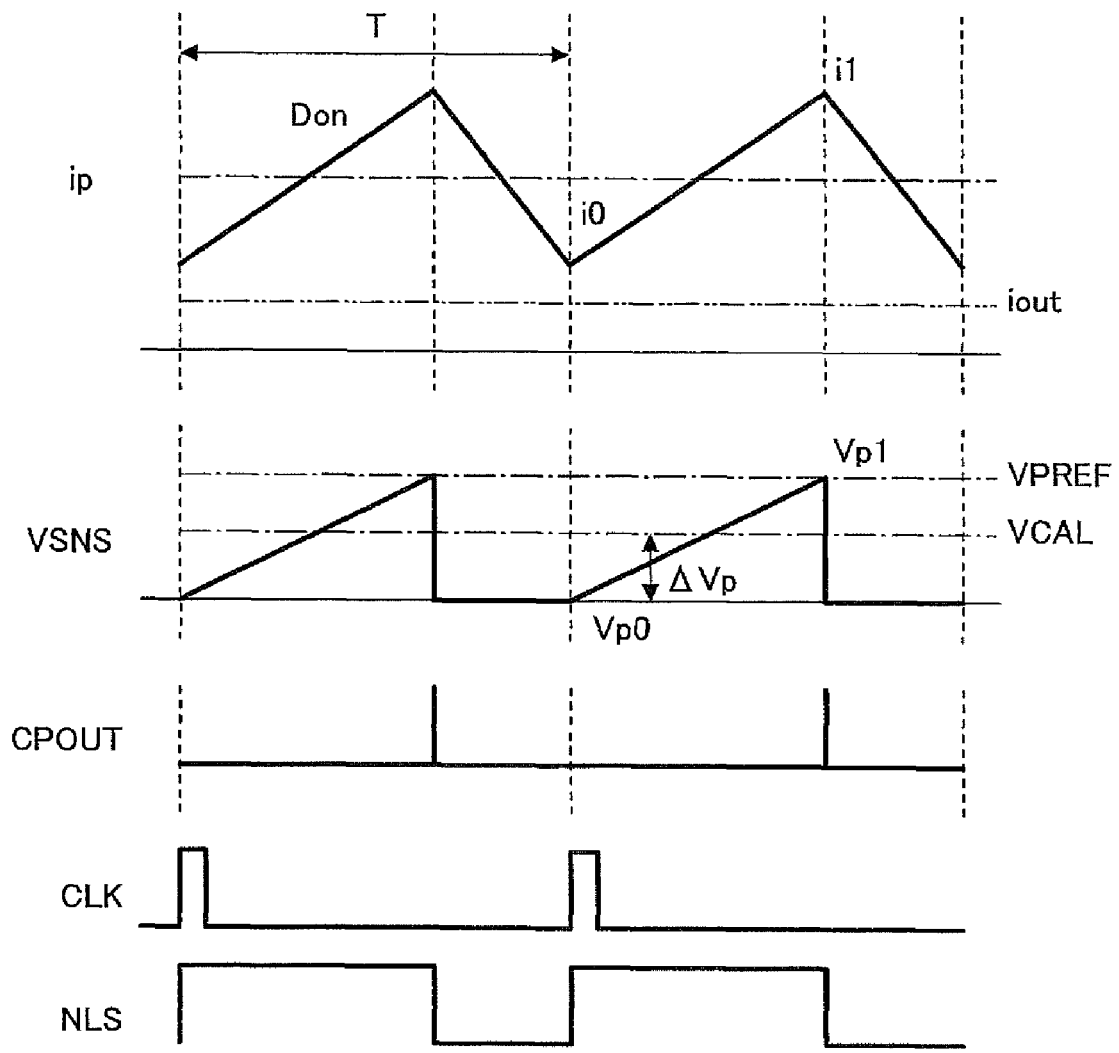
FIG. 8 is a timing chart illustrating signal waveforms of each section of the switching regulator illustrated in FIG. 3~FIG. 7.

Next, shown in FIG. 8 is a timing chart illustrating an example of the signal waveforms of each section of the switching regulator 1 illustrated in FIG. 3~FIG. 7. A more detailed explanation of the operation of the switching regulator 1 is provided with FIG. 8.

In a steady state, if one designates the initial value and the peak current value of the inductor current ip running in inductor L1 at each switch cycle as i0 and i1 respectively, if the output current iout is set to become the predetermined constant current set value iset, if the on-duty cycle when executing PWM control is designated as Don, if the frame cycle when executing PWM operation is designated as T, and if the inductor value of the inductor L1 is designated as L, the initial value i0 and peak value i1 are represented by the following formulas (6) and (7).

$$i0=iset\times Vout/Vin-Vin/L\times T\times Don/2 \quad (6)$$

$$i1=iset\times Vout/Vin+Vin/L\times T\times Don/2 \quad (7)$$

If the voltage value of the current sense voltage VSNS at the initial value i0 is designated as Vp0, and the voltage value of the current sense voltage VSNS at the peak value i1 is designated as Vp1, from the above-mentioned formula (1) the following formulas (8) and (9) can be derived.

$$Vp0=i0\times RN/RS\times RV \quad (8)$$

$$Vp1=i1\times RN/RS\times RV \quad (9)$$

If the first reference voltage VREF1 is set to satisfy the following formula (10), $$VREF1=iset\times RN/RS\times RV/(RF\times RS2) \quad (10)$$

then the adjustment reference voltage VCAL is represented by the following formula (11) derived from formulas (5) and (10).

$$VCAL=iset\times RN/RS\times RV\times Vout/Vin \quad (11)$$

The second reference voltage VPREF outputted by the reference conversion circuit 3 may be represented as the following formula (12) by applying formulas (8) and (11) to formula (2), which show that VPREF is equivalent to the prediction value of the voltage Vp1.

$$\begin{aligned}VPREF &= VCAL+\Delta VS \quad (12)\\ &= VCAL+(VCAL-Vp0)\\ &= iset\times RN/RS\times RV\times Vout/Vin+\\ &\quad RN/RS\times RV\times Vin/L\times T\times Don/2\\ &= Vp1\end{aligned}$$

The comparator 5 creates the signal CPOUT by voltage comparison of the second reference voltage VPREF after conversion and the current sense voltage VSNS becoming, $$VSNS=VPREF=Vp1$$

$$ip=i1$$

and the signal CPOUT outputted from the comparator 5 controls the time wherein the inductor current ip becomes current value i1. Therefore PWM control operations producing a constant current are possible for a set value iset.

Thus this first example of a switching transistor of an embodiment of the present invention creates the adjustment reference voltage VCAL to equal a value of the predetermined first reference voltage VREF1 multiplied by the proportion of Vout/Vin. When the clock signal CLK is at a high level, the current sense voltage VSNS is sampled when the current of the initial current value i0 runs in the switching transistor M1; when the clock signal CLK is at a low level, the potential difference ΔVS between the adjustment reference voltage VCAL and the sampled current sense voltage VSNS is added to the adjustment reference voltage VCAL to create the second reference voltage VPREF. With the signal CPOUT representing the voltage comparison results of the second reference voltage VPREF and the current sense voltage VSNS of the current sense circuit 2, each operation of the switching transistor M1 and the synchronous rectifier transistor M2 is controlled upon execution of PWM control.

Thereby there is no need for a resistor component for current detection and an integrator for current detection, fewer parts are needed, the loss of current running in the corresponding resistor is resolved, and without relying upon the inductor value there is no need to change the time constant of the integrator due to inductor value change. Also it is possible to make the output current iout not depend upon the clock signal CLK and achieve a stable output current iout.

The following is a second example according to an embodiment of the present invention.

In the first example PWM control is executed for the switching transistor M1 and the synchronous rectifier transistor M2 though it is also possible to execute VFM control of the switching transistor M1 and the synchronous rectifier transistor M2. This is illustrated as the second example according to an embodiment of the present invention.

Figure 9:
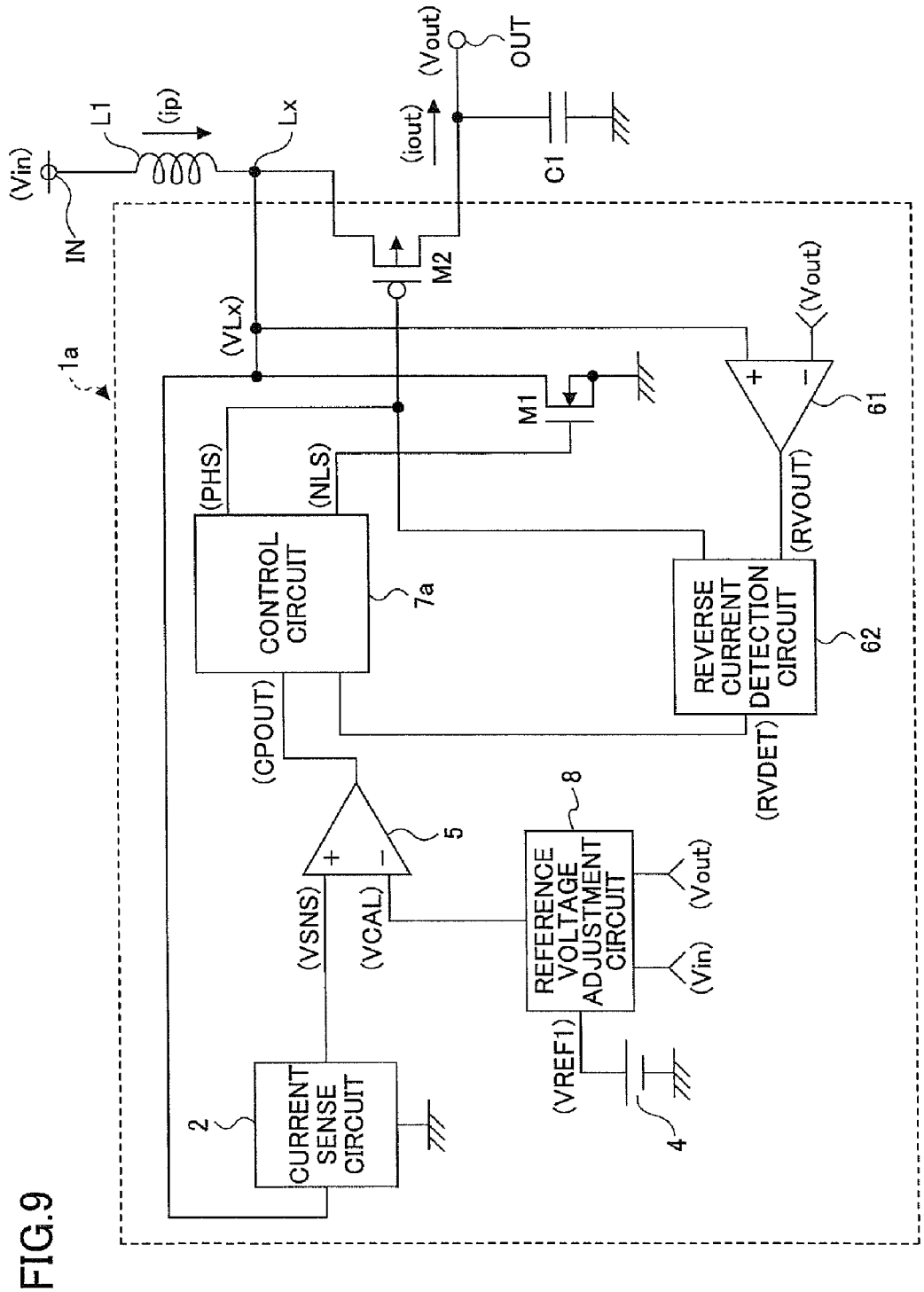
FIG. 9 is a circuit diagram illustrating the second example of a constant current output control type switching regulator.

Shown in FIG. 9 is a switching regulator circuit structure of the second example. Note that items that are the same as or similar to FIG. 3 are represented with the same symbols and the explanations pertaining to these are omitted and only the differences to FIG. 3 shall be explained.

The differences seen in FIG. 9 compared to FIG. 3 is that there are no reference conversion circuit 3 and oscillator circuit 6; instead there are added a comparator 61 which detects the sign of an occurrence of a reverse current of the current running in the inductor L1 and a reverse current detection circuit 62 which executes occurrence detection of the corresponding reverse current according to the detection results of the comparator 61. Accompanying this, the control circuit 7 of FIG. 3 is changed to control circuit 7a and the switching regulator 1 of FIG. 3 is changed to switching regulator 1a.

In FIG. 9, the switching regulator 1a creates a predetermined constant current iout from the input voltage Vin inputted in the input terminal IN and outputs it from output terminal OUT, and is a non-isolated type switching regulator that uses an inductor.

The switching regulator 1a is comprised of a switching transistor M1, a synchronous rectifier transistor M2, a current sense circuit 2, a reference voltage generation circuit 4, comparators 5 and 61, a control circuit 7a, a reference voltage adjustment circuit 8, a reverse current detection circuit 62, an inductor L1, and a capacitor C1.

A control circuit section is formed of the reference voltage generation circuit 4, the comparators 5 and 61, the control circuit 7a, the reference voltage adjustment circuit 8, and the reverse current detection circuit 62. Also in the switching regulator 1a shown in FIG. 9, each circuit except the inductor L1 and the capacitor C1 may be integrated into one IC, and the switching transistor M1 and/or the synchronous rectifier transistor M2 may be, excluding the inductor L1 and the capacitor C1, integrated into one IC.

The current sense voltage VSNS from the current sense circuit 2 is inputted into the non-inversion input terminal of the comparator 5 and the adjustment reference voltage VCAL from the reference voltage adjustment circuit 8 is inputted into the inversion input terminal of the comparator 5. Also at comparator 61, the output voltage Vout is inputted into the inversion input terminal, the voltage VLx is inputted into the non-inversion input terminal, and the signal RVOUT representing the voltage comparison results of comparator 61 is outputted to the reverse current detection circuit 62. The reverse current detection circuit 62 executes the detection of whether the inductor current ip is zero or not from the output signal RVOUT and the control signal PHS of the comparator 61, creates the signal RVDET which represents the corresponding detection results and outputs it to control circuit 7a. The control circuit 7a creates the control signal PHS and NLS from inputted signals CPOUT and RVDET respectively and outputs them.

Figure 10:
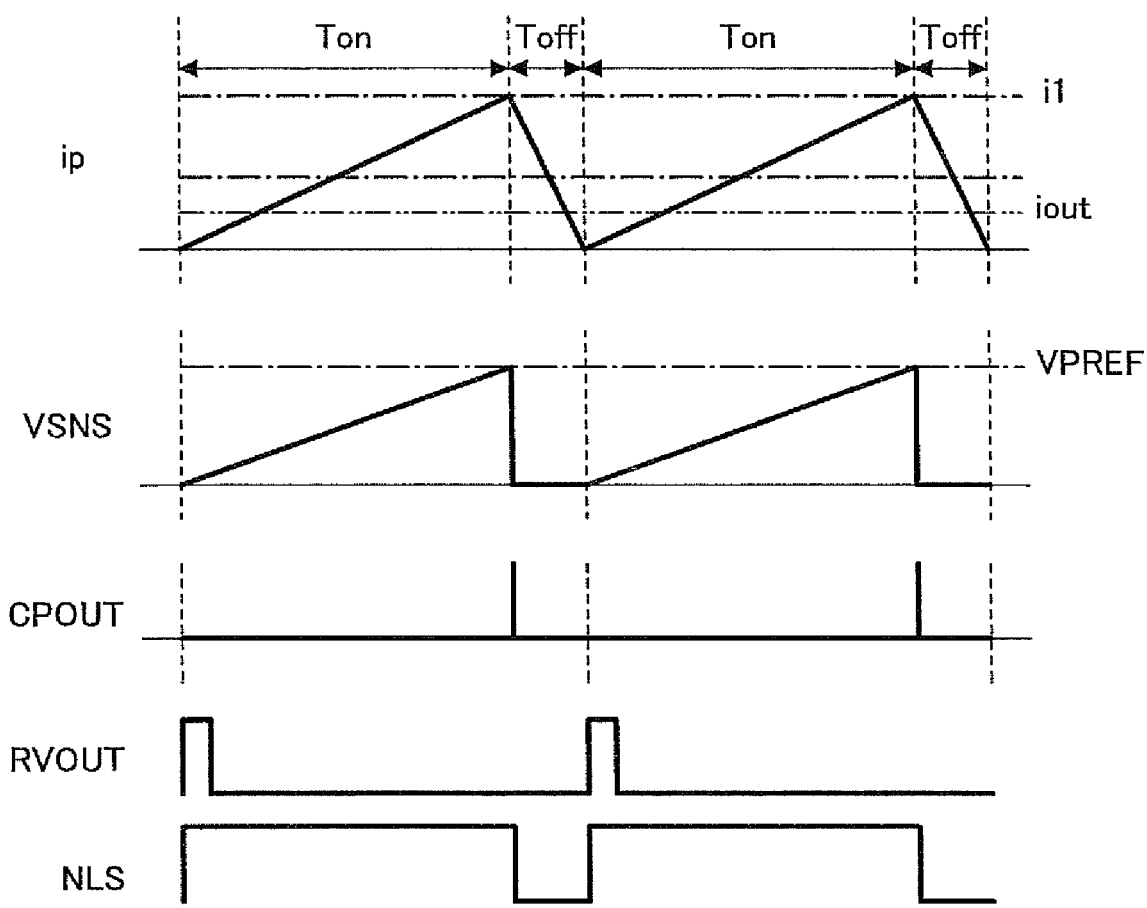
FIG. 10 is a timing chart illustrating the signal waveform of each section of switching regulator 1a illustrated in FIG. 9.

Shown in FIG. 10 is a timing chart illustrating the signal waveforms of each section of the switching regulator is shown in FIG. 9. A more detailed explanation of the operation of the switching regulator 1a is provided with FIG. 10.

In switching regulator 1a, the inductor current ip is controlled to become zero every switch cycle and if one designates the inductor current value after the switching on cycle as i1 and the constant current set value as iset, the following formula (13) can be derived.

$$i1/2 = iset \times Vout/Vin \tag{13}$$

Set the first reference voltage VREF1 to satisfy the following formula (14).

$$VREF1 = 2 \times iset \times RP/RS \times RV \tag{14}$$

From formula (5) and (14), the adjustment reference voltage VCAL obtained from the reference voltage adjustment circuit 8 is determined by the following formula (15).

$$VCAL = 2 \times iset \times RN/RS \times RV \times Vout/Vin \tag{15}$$

As can be seen from formula (15) the adjustment reference voltage VCAL outputted from the reference voltage adjustment circuit 8 is a value equivalent to the first reference voltage VREF1 multiplied by double the proportion Vout/Vin.

Also, control circuit 7a changes the control signal NLS to a low level when the signal CPOUT is at a high level, and changes the control signal NLS to a high level when the signal RVOUT is at a high level and the signal RVDET which represent the detection of a sign of a reverse current occurring is inputted from the reverse current detection circuit 62.

The current sense voltage VSNS, at a peak value i1 of the inductor current ip, after the switching transistor M1 is turned on and time Ton has passed, is represented by the following formula (16).

$$VSNS = i1 \times RN/RS \times RV \tag{16}$$

A voltage comparison between the current sense voltage VSNS and the adjustment reference voltage VCAL is carried out at comparator 5, and due to VSNS=VCAL at a time Ton, the following formula (17) can be derived which enables the control of the time Ton it takes to satisfy the above-mentioned formula (13), which in turn enables the switching regulator 1a to execute VFM operations as a constant current source.

$$i1 = 2 \times iset \times Vout/Vin \tag{17}$$

In this way the second example of a switching regulator according to an embodiment of the present invention executes control of turning on the switching transistor M1 until the current sense voltage VSNS of the current sense circuit 2 becomes the adjustment reference voltage VCAL, and when it detects that the inductor current ip has become zero executes control of turning off the switching transistor M1 executing control of the inductor current ip and thereby executing constant current output control. Thus it is possible to achieve the same effect as example 1, execute VFM control, and improve efficiency when the load current is small.

The following is a third example according to an embodiment of the present invention.

The PWM control of the first example and the VFM control of the second example may be switched according to the voltage value of the adjustment reference voltage VCAL.

This is illustrated as the third example according to an embodiment of the present invention.

Figure 11:
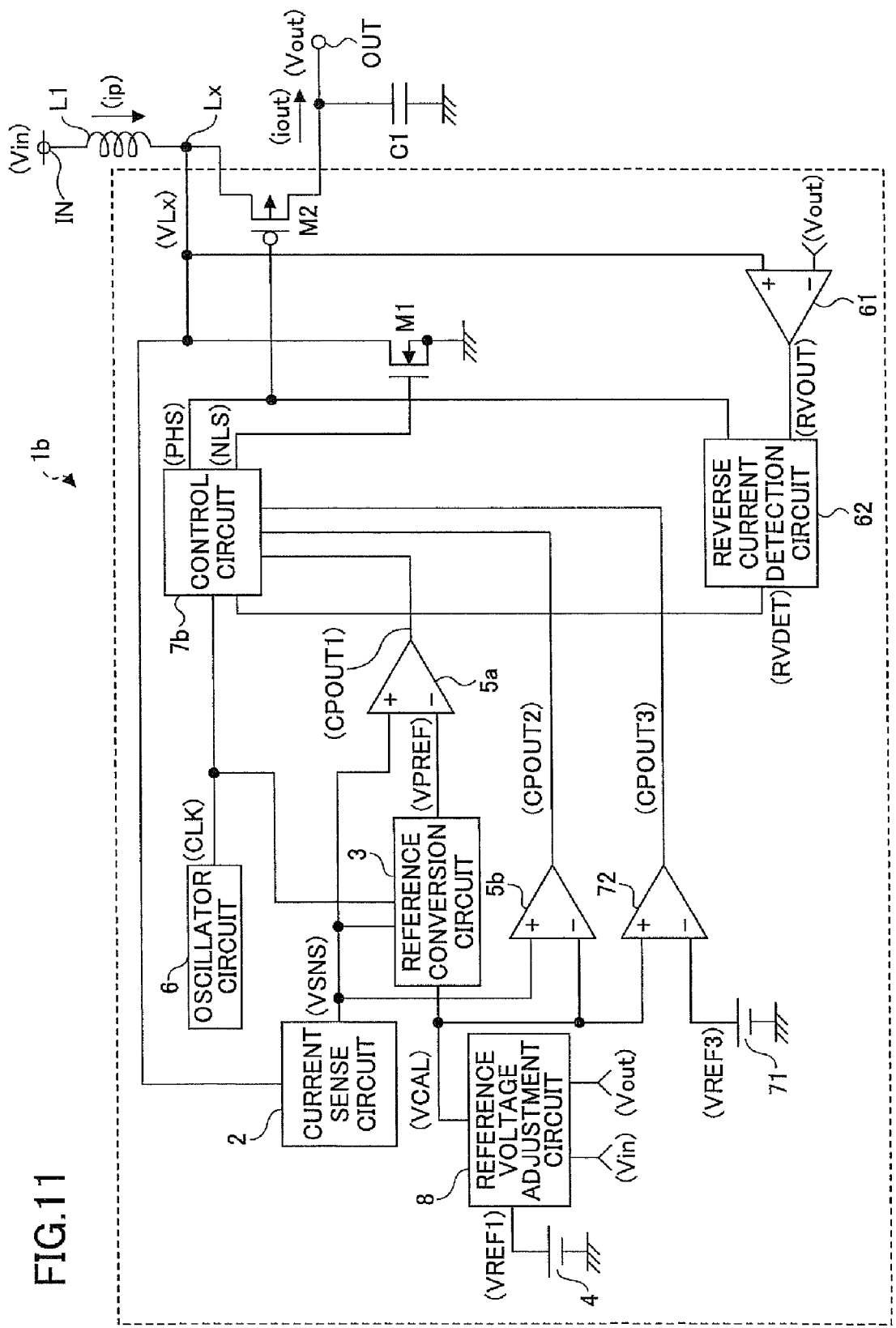
FIG. 11 is a circuit diagram illustrating the third example of a constant current output control type switching regulator.

Shown in FIG. 11 is a switching regulator circuit structure of the third example. Note that items that are the same as or similar to FIG. 3 or FIG. 9 are represented with the same symbols, and the explanations pertaining to these are omitted and only the switching of the PWM control of FIG. 3 and the VFM control of FIG. 9 according to the voltage value of the adjustment reference voltage VCAL shall be explained.

In FIG. 11, the switching regulator 1b creates a predetermined constant current iout from the input voltage Vin inputted to the input terminal IN and outputs it from the output terminal OUT, and it is a non-isolated type switching regulator that uses an inductor.

The switching regulator 1b is comprised of a switching transistor M1, a synchronous rectifier transistor M2, a current sense circuit 2, a reference conversion circuit 3, a reference voltage generation circuit 4, comparators 5a, 5b, 61, 72, an oscillator circuit 6, a control circuit 7b, a reverse current detection circuit 62, a reference voltage generation circuit 71 which creates the predetermined third reference voltage VREF3 and outputs it, an inductor L1, and a capacitor C1. Note comparator 5a corresponds to comparator 5 of FIG. 3 and comparator 5b corresponds to comparator 5 of FIG. 9.

The control circuit section is formed of the reference conversion circuits 3, the reference voltage generation circuit 4, 71, the comparators 5a, 5b, 61, 72, the oscillator circuit 6, the control circuit 7b, the reference voltage adjustment circuit 8, and the reverse current detection circuit 62. Also in the switching regulator 1b shown in FIG. 11, each circuit except the inductor L1 and the capacitor C1 may be integrated into one IC, and the switching transistor M1 and/or the synchronous rectifier transistor M2 may be, excluding the inductor L1 and the capacitor C1, integrated into one IC.

In the comparator 5a, the current sense voltage VSNS is inputted into the non-inverse input terminal and the second reference voltage VPREF is inputted into the inverse input terminal, respectively and from the output terminal is output the output signal CPOUT1 to control circuit 7b. In the comparator 5b, the current sense voltage VSNS is inputted into the non-inverse input terminal and the adjustment reference voltage VCAL is inputted into the inverse input terminal, respectively and from the output terminal is output the output signal CPOUT2 to control circuit 7b. In comparator 72, the adjustment reference voltage VCAL is inputted into the non-inverse input terminal and the third reference voltage VPREF3 is inputted into the inverse input terminal, respectively and from the output terminal is output the output signal CPOUT3 to control circuit 7b.

The comparator 72 changes the output signal CPOUT3 to a high level when the adjustment reference voltage VCAL exceeds the third reference voltage VREF3 and changes the output signal CPOUT to a low level when the adjustment reference voltage VCAL is below the third reference voltage VREF3. The control circuit 7b, when a high-level signal CPOUT3 is inputted like the example in FIG. 3, executes PWM control operations with the output signal CPOUT1 of comparator 5a; and when a low-level signal CPOUT3 is inputted like the example in FIG. 9, executes VFM control operations with the output signal CPOUT2 of comparator 5b and the output signal RVDET of the reverse current detection circuit 62.

In this way, the third example of a switching regulator according to an embodiment of the present invention switches between the PWM control explained in example 1 and the VFM control explained in example 2 according to the voltage value of the adjustment reference voltage VCAL. Thus it is possible to achieve the same effects as examples 1 and 2 and expand the setting range of the constant current.

Note in the above 3 examples, the explanations pertain to that of a booster type switching regulator but are not limited to this and may be applied to a step-down type switching regulator as well. In this case, in between the input voltage Vin and ground potential the switching transistor M1 formed of a PMOS transistor and the synchronous rectifier transistor M2 formed of a NMOS transistor are connected in series, and in between the connection section Lx of the switching transistor M1 and the synchronous rectifier transistor M2 and the output terminal OUT is connected the inductor L1. In the gate of the switching transistor M1 is inputted the control signal PHS and in the gate of the synchronous rectifier transistor M2 is inputted the control signal NLS. Also, in the case of FIG. 9 and FIG. 11 the inverse input terminal of the comparator 61 is connected to ground potential.

Also, the above explanations pertain to that of a synchronous rectifier type switching regulator but are not limited to this and may be applied to a non-synchronous rectifier type switching regulator. In this case, the synchronous rectifier transistor M2 is replaced with a diode. In the case of a booster type the cathode of the corresponding diode is connected to the output terminal OUT and the anode of the corresponding diode is connected to the connection section Lx. In a step-down type the cathode of the corresponding diode is connected to the connection section Lx and the anode of the corresponding diode is connected to ground potential.

Although the invention has been described with respect to specific embodiments for a complete and clear disclosure, the appended claims are not to be thus limited but are to be construed as embodying all modifications and alternative constructions that may occur to one skilled in the art that fairly fall within the basic teachings herein set forth.

This patent application is based on Japanese Priority Patent Application No. 2007-236578 filed on Sep. 12, 2007, the entire contents of which are hereby incorporated herein by reference.

The invention claimed is:

1. A constant current output control type switching regulator that creates a predetermined constant current from an input voltage inputted to an input terminal and outputs an output current from an output terminal, comprising:
   a switching element that executes switching according to an inputted control signal;
   an inductor that is charged by said input voltage due to the switching of the switching element;
   a rectifier element that discharges said inductor when the switching element is off and is in a cut-off state;
   a current detection circuit section that creates a proportional current proportional to a current running in said switching element, and creates and outputs a current sense voltage according to the proportional current; and
   a control circuit section that executes PWM control to control a constant current output of said switching element so that the current sense voltage of the current detection circuit section is equal to a second reference voltage,
   wherein said control circuit section creates an adjustment reference voltage by adjusting a predetermined first reference voltage according to the proportion of the output voltage that is the voltage of said output terminal and said input voltage, creates said second reference voltage by adding the voltage difference of the adjustment reference voltage and said current sense voltage to the adjustment reference voltage, creates a pulse signal representing a result of voltage comparison between said current sense voltage and said second reference voltage, and controls switching operation of the switching element by the PWM control based on said pulse signal.

2. The constant current output control type switching regulator of claim 1, wherein said control circuit section creates said adjustment reference voltage by multiplying a proportion, which is obtained from dividing said output voltage with said input voltage, by the first reference voltage.

3. The constant current output control type switching regulator of claim 1, wherein said control circuit section includes:
   a reference voltage adjustment circuit that creates said adjustment reference voltage by multiplying a proportion, which is obtained from dividing said output voltage with said input voltage, by said first reference voltage;
   a reference conversion circuit that creates said second reference voltage by adding the voltage difference between said adjustment reference voltage and said current sense voltage to the adjustment reference voltage;
   a voltage comparison circuit that executes voltage comparison of the second reference voltage from the reference conversion circuit and said current sense voltage and creates a pulse signal representing the comparison results and outputs the pulse signal, and
   a control circuit that executes PWM control of the pulse signal outputted from the voltage comparison circuit with a predetermined clock signal and executes switching control of said switching element with the PWM pulse signal obtained from the PWM control.

4. The constant current output control type switching regulator of claim 3, wherein said reference conversion circuit is formed of a switched capacitor circuit.

5. A constant current output control type switching regulator that creates a predetermined constant current from an input voltage inputted to an input terminal and outputs an output current from an output terminal, comprising:
   a switching element that executes switching according to an inputted control signal;
   an inductor that is charged by said input voltage due to the switching of the switching element;
   a rectifier element that discharges said inductor when the switching element is off and is in a cut-off state;
   a current detection circuit section that creates a proportional current proportional to a current running in said switching element, creates a current sense voltage according to the proportional current, and outputs the current sense voltage; and
   a control circuit section that executes VFM control to control a constant current output of said switching element, wherein the control circuit section creates an adjustment reference voltage by adjusting a predetermined first reference voltage according to the proportion of the output voltage that is the voltage of said output terminal and said input voltage, turns off said switching element according to a result of voltage comparison between said current sense voltage and said adjustment reference voltage, and turns on said switching element according to a result of detection to detect that the inductor current running in said inductor has become zero.

6. The constant current output control type switching regulator of claim 5, wherein said control circuit section turns off said switching element when said current sense voltage exceeds said adjustment reference voltage, and turns on said switching element when said inductor current is detected as being zero from the voltage of the connection section of said switching element and said inductor.

7. The constant current output control type switching regulator of claim 5, wherein said control circuit section creates said adjustment reference voltage by multiplying said first reference voltage by double the proportion obtained from dividing said output voltage with said input voltage.

8. A constant current output control type switching regulator that creates a predetermined constant current from an input voltage inputted to an input terminal and outputs an output current from an output terminal, comprising:
   a switching element that executes switching according to an inputted control signal;
   an inductor that is charged by said input voltage due to the switching of the switching element;
   a rectifier element that discharges said inductor when the switching element is off and is in a cut-off state;
   a current detection circuit section that creates a proportional current proportional to a current running in said switching element, creates a current sense voltage according to the proportional current, and outputs the current sense voltage;
   and a control circuit section that creates an adjustment reference voltage by adjusting a predetermined first reference voltage according to the proportion of the output voltage that is the voltage of the output terminal and said input voltage, and according to the adjustment reference voltage executes PWM control to execute constant current output control or executes VFM control to execute constant current output control of said switching element; wherein
   when said adjustment reference voltage is below the predetermined third reference voltage, said control circuit section creates a second reference voltage by adding the voltage difference of said adjustment reference voltage and said current sense voltage to the adjustment reference voltage, creates a pulse signal representing a result of voltage comparison between said current sense voltage and said second reference voltage, and controls switching operation of the switching element by the PWM control based on said pulse signal; and when said adjustment reference voltage exceeds a predetermined third reference voltage, said control circuit section turns off said switching element according to a result of voltage comparison between said current sense voltage and said adjustment reference voltage, and turns on said switching element according to a result of detection to detect that the inductor current running in said inductor has become zero.

9. The constant current output control type switching regulator of claim 8, wherein said control circuit section, when executing VFM control to execute the constant current output control, turns off said switching element when said current sense voltage exceeds said adjustment reference voltage and turns on said switching element when said inductor current is detected as being zero from the voltage of the connection section of said switching element and said inductor.

10. The constant current output control type switching regulator of claim 8, wherein said control circuit section creates said adjustment reference voltage by multiplying said first reference voltage by the proportion obtained from dividing said output voltage with said input voltage.

* * * * *